United States Patent
Xiao et al.

(10) Patent No.: US 12,252,142 B2
(45) Date of Patent: Mar. 18, 2025

(54) VEHICLE CONTROL METHOD AND SYSTEM, VEHICLE, AND STORAGE MEDIUM

(71) Applicant: NIO TECHNOLOGY (ANHUI) CO., LTD, Hefei (CN)

(72) Inventors: Bohong Xiao, Hefei (CN); Danilo Teobaldi, Hefei (CN); Da Yuan, Hefei (CN); Chao Xu, Hefei (CN); Baotian Wang, Hefei (CN); Xianhui Zhang, Hefei (CN); Zelei Zhou, Hefei (CN); Jiawang Zhong, Hefei (CN); Jiajia Xia, Hefei (CN); Ze Liu, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 321 days.

(21) Appl. No.: 17/568,551

(22) Filed: Jan. 4, 2022

(65) Prior Publication Data
US 2022/0212682 A1     Jul. 7, 2022

(30) Foreign Application Priority Data

Jan. 5, 2021 (CN) .......................... 202110006888.X

(51) Int. Cl.
*B60W 50/029*     (2012.01)
*B60W 10/08*     (2006.01)
(Continued)

(52) U.S. Cl.
CPC .......... *B60W 50/029* (2013.01); *B60W 10/08* (2013.01); *B60W 10/18* (2013.01);
(Continued)

(58) Field of Classification Search
CPC ................................................. B60W 50/029
See application file for complete search history.

(56) References Cited

U.S. PATENT DOCUMENTS 9,020,725 B2 *   4/2015   Sokoll .................... B60T 7/122
                                                              172/219
10,207,704 B2 *   2/2019   Kurt ..................... G05D 1/0212
(Continued)

FOREIGN PATENT DOCUMENTS

CN       110696820       1/2020
EP         3305620        4/2018
(Continued)

OTHER PUBLICATIONS

Extended Search Report for European Patent Application No. 22150024.2, dated May 25, 2022, 7 pages.

*Primary Examiner* — Michael A Berns
(74) *Attorney, Agent, or Firm* — Sheridan Ross P.C.

(57) ABSTRACT

This application relates to a vehicle control method and system, a vehicle, and a storage medium. The vehicle control method includes: when a braking system fails, activating a backup braking system, the backup braking system decelerating a vehicle by controlling a regenerative motor; when a steering system fails, implementing transverse control over the vehicle by controlling the braking system; and when a parking system fails, implementing parking by controlling a motor and the braking system to work alternately. According to this method, safety control over the vehicle can be implemented when the original braking system, steering system, or parking system fails.

7 Claims, 3 Drawing Sheets

(51) Int. Cl.
*B60W 10/18* (2012.01)
*B60W 30/18* (2012.01)
*B60W 50/023* (2012.01)

(52) U.S. Cl.
CPC .... *B60W 30/18127* (2013.01); *B60W 50/023* (2013.01); *B60W 2050/0292* (2013.01); *B60W 2050/0297* (2013.01); *B60W 2510/186* (2013.01); *B60W 2510/20* (2013.01); *B60W 2710/08* (2013.01); *B60W 2710/18* (2013.01)

(56) References Cited

U.S. PATENT DOCUMENTS

| | | | |
|---|---|---|---|
| 11,059,462 B2* | 7/2021 | Hecker | B60W 50/0205 |
| 11,866,026 B2* | 1/2024 | Moon | B60T 8/92 |
| 2022/0055592 A1* | 2/2022 | Leiber | B60T 13/00 |
| 2022/0097676 A1* | 3/2022 | Gesang | B60W 20/14 |
| 2022/0212682 A1* | 7/2022 | Xiao | B60T 8/885 |
| 2023/0115978 A1* | 4/2023 | Wei | B60W 30/18027 701/70 |

FOREIGN PATENT DOCUMENTS

| | | |
|---|---|---|
| EP | 3584134 | 12/2019 |
| EP | 3623242 | 3/2020 |
| WO | WO 2020/128080 | 6/2020 |

* cited by examiner

VEHICLE CONTROL METHOD AND SYSTEM, VEHICLE, AND STORAGE MEDIUM

CROSS-REFERENCE TO RELATED APPLICATION

This application claims the benefit of Chinese Patent Application No. 202110006888.X filed Jan. 5, 2021, the entire contents of which are incorporated herein by reference in its entirety.

TECHNICAL FIELD

This application relates to the field of vehicle control, and specifically, to a vehicle control method and system, a vehicle, and a storage medium.

BACKGROUND ART

At present, some motion controllers of a vehicle, such as a braking controller and a steering assistance unit, can all reach a functional safety level of ASILD (Automotive Safety Integrity Level-D), but this is only for unexpected braking, unexpected steering, steering sticking, and other failures. When a controller detects that a safety-related failure occurs on the controller, consequences such as loss of an active braking capability and loss of steering assistance are usually caused. For high-level autonomous driving, a primary responsibility for driving lies with a vehicle. When a motion control unit detects a safety-related failure in the motion control unit, the loss of the active braking capability or loss of an active steering capability cannot be used as a safe state because a driver cannot take over the vehicle immediately. In order to meet requirements for system design and functional safety, the most direct way is to equip the vehicle with a redundant braking system and a redundant steering system. However, this increases costs. In addition, functionality of each control system is not given full play.

SUMMARY OF THE INVENTION

Embodiments of this application provide a vehicle control method and system, a vehicle, and a storage medium, to ensure that safety control can be performed on the vehicle within at least a short time after an original braking system, steering system, or parking system fails.

According to an aspect of this application, a vehicle control method is provided, including: when a braking system fails, activating a backup braking system, the backup braking system decelerating a vehicle by controlling a regenerative motor; when a steering system fails, implementing transverse control over the vehicle by controlling the braking system; when a parking system fails, implementing parking by controlling a motor and the braking system to work alternately.

In some embodiments of this application, optionally, the backup braking system further decelerates the vehicle by controlling the parking system.

In some embodiments of this application, optionally, the implementing parking by controlling a motor and the braking system to work alternately includes: causing the motor to work in a first driving cycle and causing the braking system to work in a second driving cycle, where the first driving cycle and the second driving cycle occur alternately in such a manner that they are adjacent to each other in terms of time.

In some embodiments of this application, optionally, the implementing parking by controlling a motor and the braking system to work alternately includes: causing the motor to work in a first driving cycle and causing the braking system to work in a second driving cycle, where the first driving cycle and the second driving cycle occur alternately in such a manner that they are partially overlapping in terms of time, and both the motor and the braking system are caused to work in an overlapping time range.

In some embodiments of this application, optionally, the method further includes: switching to the first driving cycle when a control command for the motor is received or is expected to be received.

In some embodiments of this application, optionally, the method further includes: when duration of the first driving cycle after the switching reaches a predetermined duration threshold, controlling the motor and the braking system to return to an alternate working manner.

According to another aspect of this application, a vehicle control system is provided, including: a backup braking system, including a regenerative motor, where the backup braking system is configured to: when a braking system fails, decelerate a vehicle by controlling the regenerative motor; a backup steering system, configured to: when a steering system fails, implement transverse control over the vehicle by controlling the braking system; a backup parking system, configured to: when a parking system fails, implement parking by controlling a motor and the braking system to work alternately.

In some embodiments of this application, optionally, the backup braking system is further configured to decelerate the vehicle by controlling the parking system.

In some embodiments of this application, optionally, the backup parking system includes a first driving cycle and a second driving cycle, and is configured to cause the motor to work in the first driving cycle and cause the braking system to work in the second driving cycle, where the first driving cycle and the second driving cycle occur alternately in such a manner that they are adjacent to each other in terms of time.

In some embodiments of this application, optionally, the backup parking system includes a first driving cycle and a second driving cycle, and is configured to cause the motor to work in the first driving cycle and cause the braking system to work in the second driving cycle, where the first driving cycle and the second driving cycle occur alternately in such a manner that they are partially overlapping in terms of time, and both the motor and the braking system are caused to work in an overlapping time range.

In some embodiments of this application, optionally, the backup parking system is further configured to switch to the first driving cycle when a control command for the motor is received or is expected to be received.

In some embodiments of this application, optionally, the backup parking system is further configured to: when duration of the first driving cycle after the switching reaches a predetermined duration threshold, control the motor and the braking system to return to an alternate working manner.

According to another aspect of this application, a vehicle is provided, including any one of the foregoing vehicle control systems.

According to another aspect of this application, a computer-readable storage medium is provided, where the computer-readable storage medium stores instructions, and the instructions, when executed by a processor, cause the processor to perform any one of the foregoing methods.

BRIEF DESCRIPTION OF THE DRAWINGS

The above and other objectives and advantages of this application will be more thorough and clearer from the following detailed description in conjunction with the drawings, where the same or similar elements are represented by the same reference numerals.

DETAILED DESCRIPTION OF EMBODIMENTS

For the sake of brevity and illustrative purposes, the principles of this application are mainly described herein with reference to its exemplary embodiments. However, those skilled in the art can easily appreciate that the same principle can be equivalently applied to all types of vehicle control methods and systems, vehicles, and storage media, and a same or similar principle can be implemented. These variations do not depart from the true spirit and scope of this application.

Figure 1:
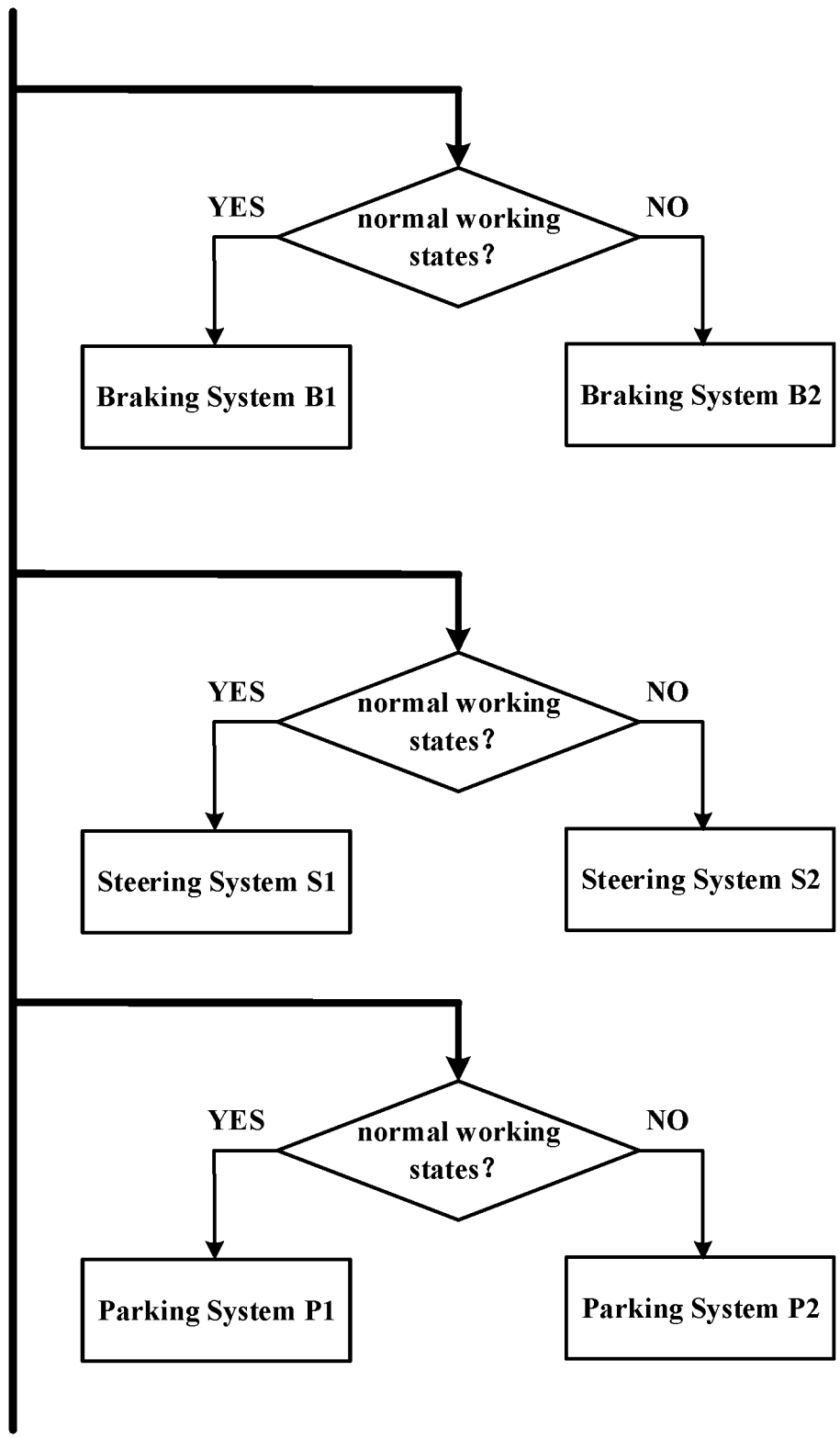
FIG. 1 shows a vehicle control method according to an embodiment of this application.

According to an aspect of this application, a vehicle control method is provided. As shown in FIG. 1, the vehicle control method may include: first determining status of a braking system B1, a steering system S1, and a parking system P1, where if these systems are in normal working states, the braking system B1, the steering system S1, and the parking system P1 continue performing operations related to braking, steering, and parking, respectively. However, when one or more of these motion controllers (systems) fail, a maximum motion control capability of a vehicle should be guaranteed as far as possible. Specifically, the following control process provides a possibility that high-level autonomous driving can operate without increasing hardware costs even when some functions fail.

As shown in FIG. 1, the vehicle control method includes: determining whether the braking system B1 fails; and when the braking system B1 fails, activating a backup braking system B2, the backup braking system B2 decelerating the vehicle by controlling a regenerative motor. According to this method, when the braking system B1 loses an active braking capability, a vehicle control unit can implement active deceleration of the vehicle by controlling a motor Regen.

In some embodiments of this application, the backup braking system B2 further decelerates the vehicle by controlling the parking system. For example, if a safety-related critical failure occurs on a braking control unit (BCU) and the BCU loses an active braking capability, the vehicle control unit (VCU) sends a request for a regenerative torque (Regen Torque) to a power electronic unit (PEU) by activating an internal backup braking function. In addition, a parking braking control unit (FCCU) may be pulled up for assisting, thereby ensuring that an active deceleration capability of the vehicle can be implemented to a certain extent. In some examples, the deceleration capability depends on an allowed maximum Regen Torque. The allowed maximum Regen Torque is affected by a battery capacity, a temperature, a motor capacity, and functions related to stability control.

Still referring to FIG. 1, the vehicle control method includes: determining whether the steering system S1 fails; and when the steering system S1 fails, activating the backup steering system S2, the backup steering system S2 implementing transverse control over the vehicle by controlling the braking system B1. When the steering system S1 loses an active steering capability, the vehicle control unit may add a yaw torque to the entire vehicle by controlling the braking system B1, thereby ensuring that the vehicle can travel stably in a current lane before a driver takes over the vehicle.

Specifically, for example, when the vehicle is in an autonomous driving functional state, if a safety-related critical failure occurs on an electric power steering system (EPS), the EPS may lose an active steering capability. In this case, the VCU activates an internal backup steering function, calculates a target yaw rate (Target yaw rate), and sends the target yaw rate to the BCU, thereby ensuring that a transverse control capability of the vehicle can be implemented to a certain extent.

Further, as shown in FIG. 1, the vehicle control method includes: determining whether the parking system P1 fails; and when the parking system P1 fails, activating a backup parking system P2, the backup parking system P2 implementing parking by controlling a motor and the braking system B1 to work alternately. When an electric parking system fails, the vehicle control unit implements a parking effect by controlling the motor and the braking system B1 alternately.

Specifically, if a safety-related critical failure occurs on the FCCU and the FCCU loses an active parking capability, the VCU sends a parking (Hold) request to the PEU by activating an internal backup parking function. In addition, the VCU may further request the BCU to apply a braking force to a wheel, thereby resolving a problem of a vehicle skid on the pavement or incapability of the PEU to work excessively long hours for parking (Hold), and further ensuring that the vehicle has a certain parking capability.

In some embodiments of the present invention, the vehicle control method may further include: when a safety-related critical failure occurs on the VCU and the VCU loses an active longitudinal control capability, activating an internal backup longitudinal control function by using an ADC; and sending a braking force instruction to the BCU as expected, thereby ensuring that the vehicle further has a certain longitudinal motion control capability.

Figure 3:
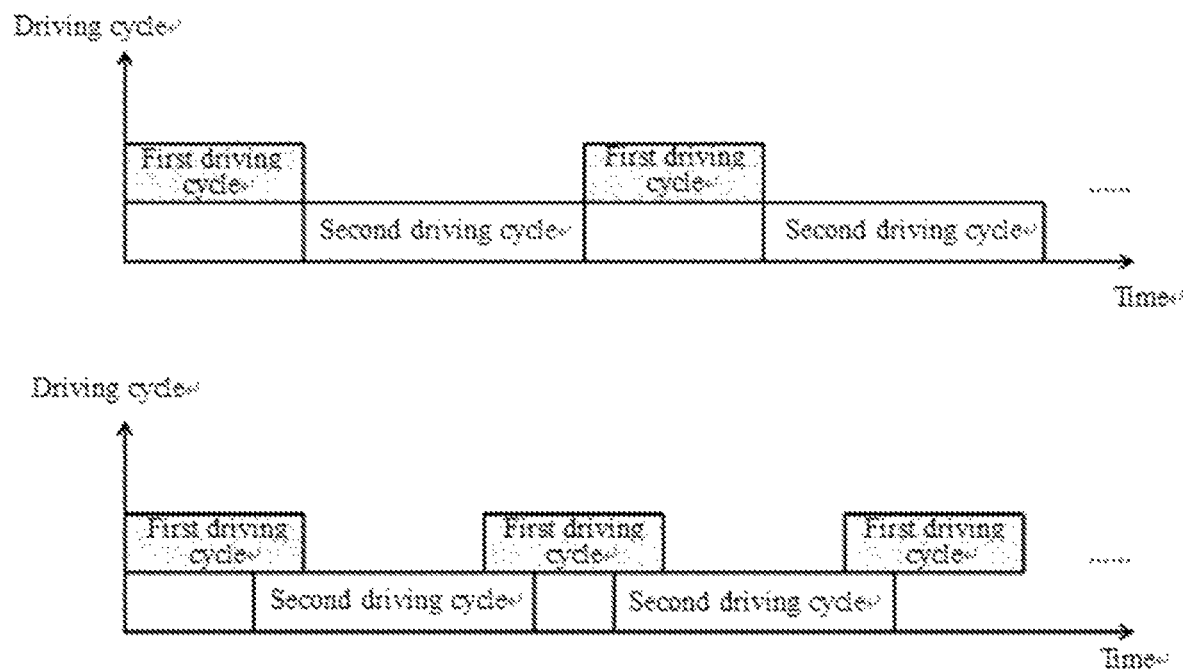
FIG. 3 shows a principle of switching between driving cycles according to an embodiment of this application.

In some embodiments of this application, as shown in an upper part of FIG. 3, that the backup parking system P2 implements parking by controlling a motor and the braking system B1 to work alternately includes: causing the motor to work in a first driving cycle and causing the braking system B1 to work in a second driving cycle, where the first driving cycle and the second driving cycle occur alternately in such a manner that they are adjacent to each other in terms of time. In this example, working scenarios of the backup parking system P2 are classified based on specific working devices: in the first driving cycle, only the motor works; and in the second driving cycle, only the braking system B1 works. The first driving cycle and the second driving cycle are divided by time. To avoid vehicle sliding, the first driving cycle and the second driving cycle occur alternately in a continuous manner. The second driving cycle starts at the time when the first driving cycle ends; the first driving cycle starts at the time when the second driving cycle ends;

and the first driving cycle and the second driving cycle occur alternately in this way repeatedly until the backup parking function is no longer required. This manner can resolve a problem of a vehicle skid on the pavement or incapability of the motor to work excessively long hours for parking. In addition, duration of the first driving cycle may be determined based on an allowed amount of heat generated by the motor. Although the duration of the first driving cycle and that of the second driving cycle that are shown in the figure are approximately the same, the duration of the first driving cycle and that of the second driving cycle are not necessarily equal to each other, provided that the vehicle can be parked without damaging the motor.

In some embodiments of this application, as shown in a lower part of FIG. 3, that the backup parking system P2 implements parking by controlling a motor and the braking system B1 to work alternately includes: causing the motor to work in a first driving cycle and causing the braking system B1 to work in a second driving cycle, where the first driving cycle and the second driving cycle occur alternately in such a manner that they are partially overlapping in terms of time, and both the motor and the braking system B1 are caused to work in an overlapping time range. Similar to the example described above, in this example, working scenarios of the backup parking system P2 are classified based on specific working devices: in the first driving cycle, only the motor works; and in the second driving cycle, only the braking system B1 works; and in an overlapping time range of the first driving cycle and the second driving cycle, both the motor and the braking system B1 work. The first driving cycle and the second driving cycle are divided by time. To avoid vehicle sliding and a risk of vehicle sliding in a switching process, the first driving cycle and the second driving cycle occur alternately in such a manner that they are partially overlapping. The second driving cycle starts before the first driving cycle ends; the first driving cycle starts before the second driving cycle ends; and the first driving cycle and the second driving cycle are partially overlapping in terms of time. The first driving cycle and the second driving cycle occur alternately in this way repeatedly until the backup parking function is no longer required. In addition to an advantage of the previous example, this example can further avoid the risk of vehicle sliding in the switching process.

During transition from the first driving cycle to the second driving cycle, an input torque of the motor may be gradually reduced to zero (the first driving cycle ends when the input torque reaches zero). During transition from the second driving cycle to the first driving cycle, an input torque of the motor may be gradually increased to a stable maximum value (the second driving cycle ends when the input torque reaches the stable maximum value). Switching between the motor and the braking system B1 in this manner can avoid vehicle sliding caused by sudden loss of a parking capability in the switching process.

In some embodiments of this application, the vehicle control method further includes: switching to the first driving cycle when a control command for the motor is received or is expected to be received, where the motor works continuously to switch from a parking state to a forward or reverse longitudinal motion state. This manner simplifies control logic and reduces start/stop times of the motor.

Figure 4:
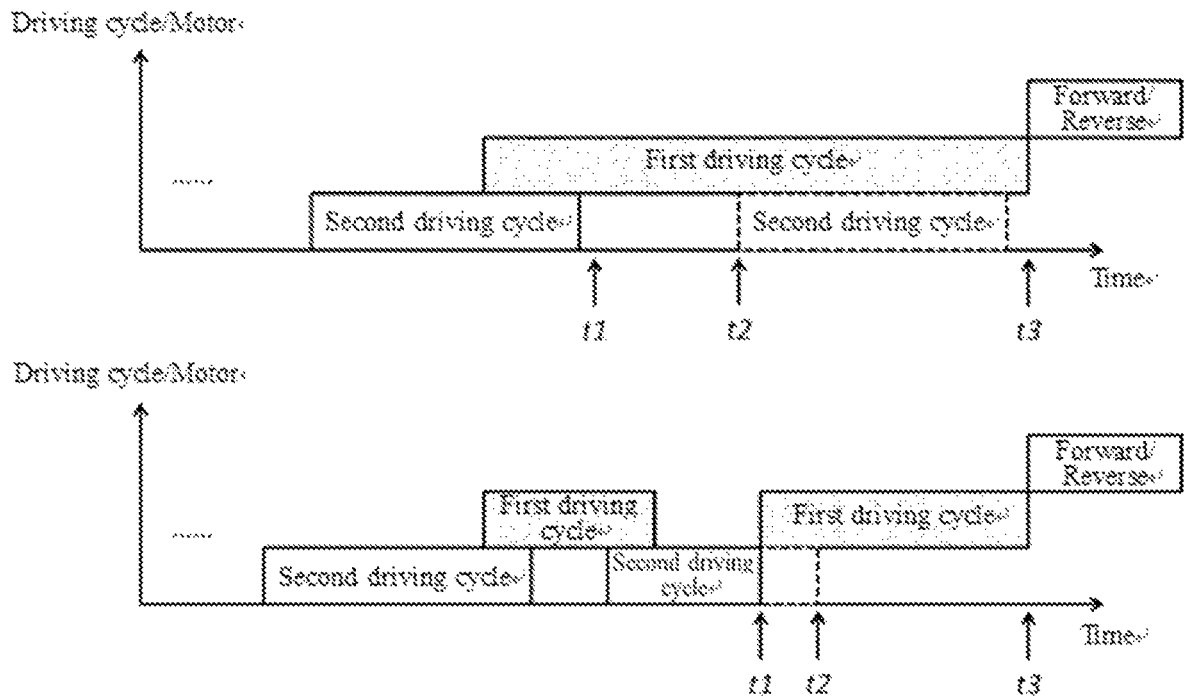
FIG. 4 shows a principle of switching between driving cycles and between motor tasks according to an embodiment of this application.

As shown in an upper part of FIG. 4, the first driving cycle and the second driving cycle of the backup parking system P2 occur alternately in such a manner that they are partially overlapping in terms of time (similar to a principle of a solution in which the first driving cycle and the second driving cycle occur alternately in a continuous manner). At moment t1 when the backup parking system P2 is in the first driving cycle, the vehicle receives a control command for the motor (for example, an accelerator pedal is stepped on when the vehicle is at a D position or an R position) or is expected to receive a control command for the motor (for example, the accelerator pedal is generally stepped on for a relatively short time to switch from a P position to the D position or the R position). According to normal logic, the backup parking system P2 is about to switch to the second driving cycle (shown by a dashed frame in the figure) at moment t2. However, the control command for the motor is received or is expected to be received at moment t1, but the control command does not directly cause the vehicle to exit from the parking state (for example, the accelerator pedal is stepped on lightly), and the vehicle still needs to remain in the parking state. In this case, the backup parking system P2 does not enter the second driving cycle, but remains in the first driving cycle until moment t3. At this moment, a condition for changing the torque of the motor is satisfied, the vehicle exits from the parking state, and the motor is driven to enter a longitudinal motion state (for example, the forward or reverse longitudinal motion state).

As shown in a lower part of FIG. 4, the first driving cycle and the second driving cycle of the backup parking system P2 occur alternately in such a manner that they are partially overlapping in terms of time. At moment t1 when the backup parking system P2 is in the second driving cycle, the vehicle receives a control command for the motor or is expected to receive a control command for the motor. According to normal logic, the backup parking system P2 remains in the second driving cycle shown by a dashed frame in the figure, and is about to switch to the first driving cycle at moment t2. However, the control command for the motor is received or is expected to be received at moment t1, but the control command does not directly cause the vehicle to exit from the parking state (for example, the accelerator pedal is stepped on lightly), and the vehicle still needs to remain in the parking state. In this case, for quick response, the backup parking system P2 may be caused to switch to the first driving cycle in advance and remain in the first driving cycle until moment t3. At this moment, a condition for changing the torque of the motor is satisfied, the vehicle exits from the parking state, and the motor is driven to enter a longitudinal motion state (for example, the forward or reverse longitudinal motion state).

In some embodiments of the present invention, if duration for which the backup parking system P2 remains in the first driving cycle exceeds a predetermined duration threshold, but the vehicle still does not exit from the parking state, the backup parking system P2 may alternatively be restored to a working state that is described above and in which the first driving cycle and the second driving cycle occur alternately in such a manner that they are adjacent to each other in terms of time or the first driving cycle and the second driving cycle occur alternately in such a manner that they are partially overlapping in terms of time. In this way, damage to the motor caused by excessive heat accumulation can be avoided.

Figure 2:
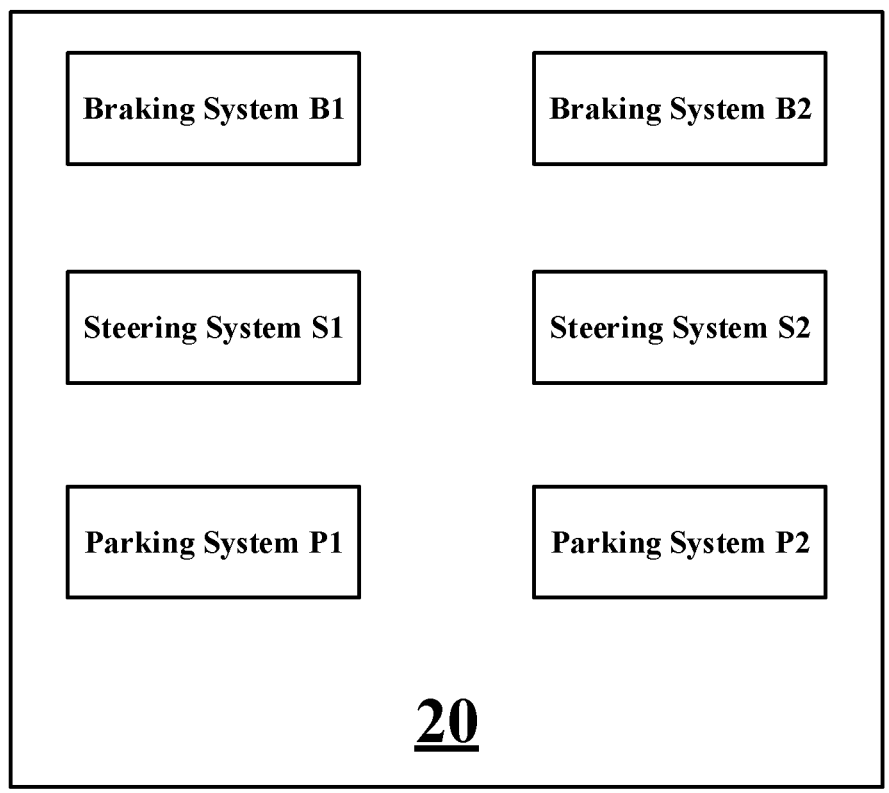
FIG. 2 shows a vehicle control system according to an embodiment of this application.

According to another aspect of this application, a vehicle control system is provided. As shown in FIG. 2, the vehicle control system 20 includes a backup braking system B2, a backup steering system S2, and a backup parking system P2. The vehicle control system 20 may first determine status of a braking system B1, a steering system S1, and a parking system P1. If these systems are in normal working states, the braking system B1, the steering system S1, and the parking system P1 continue performing operations related to braking, steering, and parking, respectively. However, when one or more of these motion controllers (systems) fail, a maximum motion control capability of a vehicle should be guaranteed as far as possible. Specifically, the following control logic provides a possibility that high-level autonomous driving can operate without increasing hardware costs even when some functions fail.

The backup braking system B2 of the vehicle control system 20 includes a regenerative motor (not shown). The backup braking system B2 is configured to: when the braking system B1 fails, decelerate a vehicle by controlling the regenerative motor. According to such settings of the backup braking system B2, when the braking system B1 loses an active braking capability, a vehicle control unit can implement active deceleration of the vehicle by controlling a motor Regen.

In some embodiments of this application, the backup braking system B2 is further configured to decelerate the vehicle by controlling the parking system. For example, the backup braking system B2 may be configured in the following manner: if a safety-related critical failure occurs on a BCU and the BCU loses an active braking capability, the backup braking system B2 may instruct a VCU to send a request for a regenerative torque (Regen Torque) to a PEU by activating an internal backup braking function. In addition, the backup braking system B2 may further instruct an FCCU to be pulled up, thereby ensuring that an active deceleration capability of the vehicle can be implemented to a certain extent. In some examples, the deceleration capability depends on an allowed maximum Regen Torque. The allowed maximum Regen Torque is affected by a battery capacity, a temperature, a motor capacity, and functions related to stability control.

The backup steering system S2 of the vehicle control system 20 is configured to: when the steering system fails, implement transverse control over the vehicle by controlling the braking system B1. When the steering system S1 loses an active steering capability, the backup steering system S2 may instruct the vehicle control unit to add a yaw torque to the entire vehicle by controlling the braking system B1, thereby ensuring that the vehicle can travel stably in a current lane before a driver takes over the vehicle.

Specifically, for example, when the vehicle is in an autonomous driving functional state, if a safety-related critical failure occurs on an EPS, the EPS may lose an active steering capability. In this case, the backup steering system S2 may instruct the VCU to activate an internal backup steering function, calculate a target yaw rate (Target yaw rate), and send the target yaw rate to the BCU, thereby ensuring that a transverse control capability of the vehicle can be implemented to a certain extent.

The backup parking system P2 of the vehicle control system 20 is configured to: when the parking system fails, implement parking by controlling a motor and the braking system B1 to work alternately. When an electric parking system fails, the backup parking system P2 may instruct the vehicle control unit to implement a parking effect by controlling the motor and the braking system B1 alternately.

Specifically, if a safety-related critical failure occurs on the FCCU and the FCCU loses an active parking capability, the backup parking system P2 may instruct the VCU to send a parking (Hold) request to the PEU by activating an internal backup parking function. In addition, the backup parking system P2 may further request the BCU to apply a braking force to a wheel, thereby resolving a problem of a vehicle skid on the pavement or incapability of the PEU to work excessively long hours for parking (Hold), and further ensuring that the vehicle has a certain parking capability.

In some embodiments of the present invention, when a safety-related critical failure occurs on the VCU and the VCU loses an active longitudinal control capability, the backup parking system P2 may activate an internal backup longitudinal control function by using an ADC; and send a braking force instruction to the BCU as expected, thereby ensuring that the vehicle further has a certain longitudinal motion control capability.

In some embodiments of this application, as shown in the upper part of FIG. 3, the backup parking system P2 includes a first driving cycle and a second driving cycle, and is configured to cause the motor to work in the first driving cycle and cause the braking system B1 to work in the second driving cycle, where the first driving cycle and the second driving cycle occur alternately in such a manner that they are adjacent to each other in terms of time. In this example, working scenarios of the backup parking system P2 are classified based on specific working devices: in the first driving cycle, only the motor works; and in the second driving cycle, only the braking system B1 works. The first driving cycle and the second driving cycle are divided by time. To avoid vehicle sliding, the first driving cycle and the second driving cycle occur alternately in a continuous manner. The second driving cycle starts at the time when the first driving cycle ends; the first driving cycle starts at the time when the second driving cycle ends; and the first driving cycle and the second driving cycle occur alternately in this way repeatedly until the backup parking function is no longer required. This manner can resolve a problem of a vehicle skid on the pavement or incapability of the motor to work excessively long hours for parking. In addition, duration of the first driving cycle may be determined based on an allowed amount of heat generated by the motor. Although the duration of the first driving cycle and that of the second driving cycle that are shown in the figure are approximately the same, the duration of the first driving cycle and that of the second driving cycle are not necessarily equal to each other, provided that the vehicle can be parked without damaging the motor.

In some embodiments of this application, as shown in the lower part of FIG. 3, the backup parking system P2 includes a first driving cycle and a second driving cycle, and is configured to cause the motor to work in the first driving cycle and cause the braking system B1 to work in the second driving cycle, where the first driving cycle and the second driving cycle occur alternately in such a manner that they are partially overlapping in terms of time, and both the motor and the braking system B1 are caused to work in an overlapping time range. Similar to the example described above, in this example, working scenarios of the backup parking system P2 are classified based on specific working devices: in the first driving cycle, only the motor works; in the second driving cycle, only the braking system B1 works; and in an overlapping time range of the first driving cycle and the second driving cycle, both the motor and the braking system B1 work. The first driving cycle and the second driving cycle are divided by time. To avoid vehicle sliding and a risk of vehicle sliding in a switching process, the first driving cycle and the second driving cycle occur alternately in such a manner that they are partially overlapping. The second driving cycle starts before the first driving cycle ends; the first driving cycle starts before the second driving cycle ends; and the first driving cycle and the second driving cycle are partially overlapping in terms of time. The first driving cycle and the second driving cycle occur alternately in this way repeatedly until the backup parking function is no longer required. In addition to an advantage of the previous example, this example can further avoid the risk of vehicle sliding in the switching process.

During transition from the first driving cycle to the second driving cycle, an input torque of the motor may be gradually reduced to zero (the first driving cycle ends when the input torque reaches zero). During transition from the second driving cycle to the first driving cycle, an input torque of the motor may be gradually increased to a stable maximum value (the second driving cycle ends when the input torque reaches the stable maximum value). Switching between the motor and the braking system B1 in this manner can avoid vehicle sliding caused by sudden loss of a parking capability in the switching process.

In some embodiments of this application, the backup parking system P2 is further configured to switch to the first driving cycle when a control command for the motor is received or is expected to be received, where the motor works continuously to switch from a parking state to a forward or reverse longitudinal motion state. This manner simplifies control logic and reduces start/stop times of the motor.

As shown in the upper part of FIG. 4, the first driving cycle and the second driving cycle of the backup parking system P2 occur alternately in such a manner that they are partially overlapping in terms of time (similar to a principle of a solution in which the first driving cycle and the second driving cycle occur alternately in a continuous manner). At moment t1 when the backup parking system P2 is in the first driving cycle, the vehicle receives a control command for the motor (for example, an accelerator pedal is stepped on when the vehicle is at a D position or an R position) or is expected to receive a control command for the motor (for example, the accelerator pedal is generally stepped on for a relatively short time to switch from a P position to the D position or the R position). According to normal logic, the backup parking system P2 is about to switch to the second driving cycle (shown by the dashed frame in the figure) at moment t2. However, the control command for the motor is received or is expected to be received at moment t1, but the control command does not directly cause the vehicle to exit from the parking state (for example, the accelerator pedal is stepped on lightly), and the vehicle still needs to remain in the parking state. In this case, the backup parking system P2 does not enter the second driving cycle, but remains in the first driving cycle until moment t3. At this moment, a condition for changing the torque of the motor is satisfied, the vehicle exits from the parking state, and the motor is driven to enter a longitudinal motion state (for example, the forward or reverse longitudinal motion state).

As shown in the lower part of FIG. 4, the first driving cycle and the second driving cycle of the backup parking system P2 occur alternately in such a manner that they are partially overlapping in terms of time. At moment t1 when the backup parking system P2 is in the second driving cycle, the vehicle receives a control command for the motor or is expected to receive a control command for the motor. According to normal logic, the backup parking system P2 remains in the second driving cycle shown by the dashed frame in the figure, and is about to switch to the first driving cycle at moment t2. However, the control command for the motor is received or is expected to be received at moment t1, but the control command does not directly cause the vehicle to exit from the parking state (for example, the accelerator pedal is stepped on lightly), and the vehicle still needs to remain in the parking state. In this case, for quick response, the backup parking system P2 may be caused to switch to the first driving cycle in advance and remain in the first driving cycle until moment t3. At this moment, a condition for changing the torque of the motor is satisfied, the vehicle exits from the parking state, and the motor is driven to enter a longitudinal motion state (for example, the forward or reverse longitudinal motion state).

In some embodiments of this application, the backup parking system P2 is further configured to: when duration of the first driving cycle after the switching reaches a predetermined duration threshold, control the motor and the braking system to return to an alternate working manner. In some embodiments of the present invention, if duration for which the backup parking system P2 remains in the first driving cycle exceeds a predetermined duration threshold, but the vehicle still does not exit from the parking state, the backup parking system P2 may alternatively be restored to a working state that is described above and in which the first driving cycle and the second driving cycle occur alternately in such a manner that they are adjacent to each other in terms of time or the first driving cycle and the second driving cycle occur alternately in such a manner that they are partially overlapping in terms of time. In this way, damage to the motor caused by excessive heat accumulation can be avoided.

According to another aspect of this application, a vehicle is provided, including any one of the foregoing vehicle control systems.

According to another aspect of this application, a computer-readable storage medium is provided, in which instructions are stored, and when the instructions are executed by a processor, the processor is enabled to perform any of the vehicle control methods described above. The computer-readable storage medium in this application includes various computer storage media, and may be any usable medium accessible to a general-purpose or special-purpose computer. For example, the computer-readable storage medium may include a RAM, a ROM, an EPROM, an EEPROM, a register, a hard disk, a removable hard disk, a CD-ROM or another optical memory, a magnetic disk memory or another magnetic storage device, or any other transitory or non-transitory media that can carry or store expected program code having an instruction or data structure form and be accessible to the general-purpose or special-purpose computer or a general-purpose or special-purpose processor. Data is usually copied magnetically in a disk used in this specification, while data is usually copied optically by using lasers in a disc. A combination thereof shall also fall within the protection scope of computer-readable media. For example, the storage medium is coupled to a processor, so that the processor can read data from and write data to the storage medium. In an alternative solution, the storage medium may be integrated into the processor. The processor and the storage medium may reside in an ASIC. The ASIC may reside in a user terminal. In an alternative solution, the processor and the storage medium may reside as discrete assemblies in a user terminal.

According to some of the foregoing samples of the present invention, it can be ensured, without increasing hardware costs, that the vehicle can still travel when motion control of the vehicle partially fails, thereby ensuring that after a motion control actuator fails, a high-level autonomous driving function can still provide a certain motion control capability, which provides a possibility that after an autonomous driving failure occurs, the driver can take over the vehicle and the vehicle can enter a safe state successfully. In the samples or their drawings of the present invention, several unit modules (such as the backup steering system and the backup parking system in FIG. 1) are shown for illustrative purposes. However, those skilled in the art should know that these unit modules may not be necessary for implementing the present invention. All variations that can implement technical solutions described in the claims shall fall within the protection scope of this application.

The foregoing descriptions are merely the embodiments of this application, but are not intended to limit the protection scope of this application. Any feasible variation or replacement figured out by those skilled in the art within the technical scope disclosed in this application shall fall within the protection scope of this application. In the case of no conflict, the embodiments of this application and features in the embodiments may be combined with each other. The protection scope of this application shall be subject to the protection scope of the claims.

What is claimed is:

1. A vehicle control method, comprising:
   when a braking system fails, activating a backup braking system, which decelerates a vehicle by controlling a regenerative motor;
   when a steering system fails, implementing transverse control over the vehicle by controlling the braking system; and
   when a parking function fails, implementing parking by controlling a motor and the braking system to work alternately,
   wherein the implementing parking by controlling a motor and the braking system to work alternately comprises: causing the motor to work in a first driving cycle and causing the braking system to work in a second driving cycle, wherein the first driving cycle and the second driving cycle occur alternately in such a manner that they are partially overlapping in terms of time, and both the motor and the braking system are caused to work in an overlapping time range, and remaining in the first driving cycle or switching to the first driving cycle from the second driving cycle when a control command for the motor is received or is expected to be received.

2. The method according to claim 1, wherein the backup braking system further decelerates the vehicle by controlling the parking function.

3. The method according to claim 1, wherein the method further comprises: when a duration of the first driving cycle after the switching reaches a predetermined duration threshold, controlling the motor and the braking system to return to an alternate working manner.

4. A vehicle control system, comprising:
   a backup braking system, comprising a regenerative motor, wherein the backup braking system is configured to: when a braking system fails, decelerate a vehicle by controlling the regenerative motor;
   a backup steering system, configured to: when a steering system fails, implement transverse control over the vehicle by controlling the braking system; and
   a vehicle control unit, configured to: when a parking function fails, implement parking by controlling a motor and the braking system to work alternately,
   wherein the vehicle control unit comprises a first driving cycle and a second driving cycle, and is configured to cause the motor to work in the first driving cycle and cause the braking system to work in the second driving cycle, wherein the first driving cycle and the second driving cycle occur alternately in such a manner that they are partially overlapping in terms of time, and both the motor and the braking system are caused to work in an overlapping time range, and wherein the vehicle control unit is further configured to remain in the first driving cycle or switch to the first driving cycle from the second driving cycle when a control command for the motor is received or is expected to be received.

5. The system according to claim 4, wherein the backup braking system is further configured to decelerate the vehicle by controlling the parking function.

6. The system according to claim 4, wherein the vehicle control unit is further configured to: when duration of the first driving cycle after the switching reaches a predetermined duration threshold, control the motor and the braking system to return to an alternate working manner.

7. A vehicle, comprising the vehicle control system according to claim 4.

* * * * *